Feb. 23, 1943.   O. A. OLSEN   2,311,993
VARIABLE SPEED PULLEY DRIVE
Filed June 19, 1940

INVENTOR
OSWALD A. OLSEN.
BY John A. Hanrahan
ATTORNEY

Patented Feb. 23, 1943

2,311,993

UNITED STATES PATENT OFFICE 2,311,993

VARIABLE SPEED PULLEY DRIVE

Oswald A. Olsen, Stratford, Conn.

Application June 19, 1940, Serial No. 341,355

5 Claims. (Cl. 74—217)

This invention relates to new and useful improvements in power transmission devices and and has particular relation to a variable speed pulley drive.

The objects and advantages of the invention will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claims.

Figure 2:
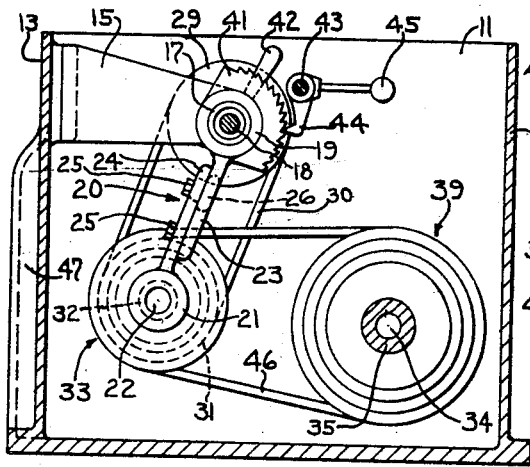
Fig. 2 is a view looking from the lower side of Fig. 1 but with the near wall of the casing removed.
Figure 1:
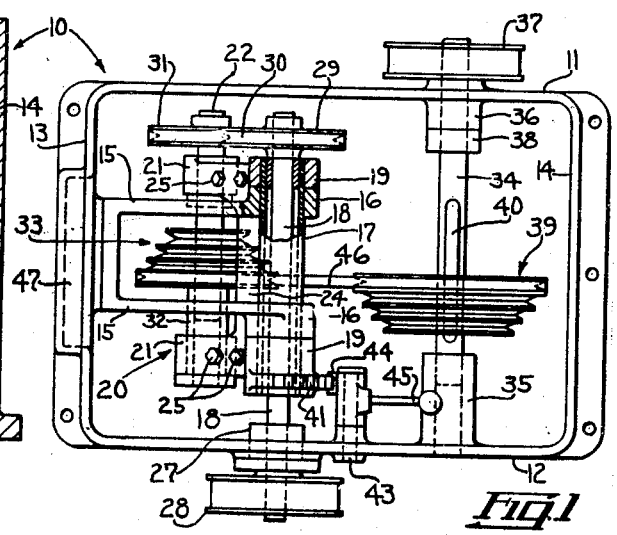
Fig. 1 is a plan view showing the transmission of the invention.

Referring in detail to the drawing and at first particularly to the invention as shown in Figs. 1 and 2, at 10 is generally indicated any suitable housing including side walls 11 and 12 and end walls 13 and 14. Mounted on wall 13 is a two-armed bracket 15, the forward ends of the arms of which comprise bearings 16 serving to mount a sleeve or tube 17 in which is a turnable shaft 18 and on the end portions of which (at the outer side of the bearing 16) are mounted the upper portions 19 of adjustable brackets or supports generally designated 20.

Each such support in addition to the part 19, includes a lower part 21 and these lower parts rotatably mount a shaft 22. Bracket parts 19 and 21 include overlapping portions 23 and 24 adjustably secured together as by screws 25 and a cross-member 26 connects the two bracket portions 19 together so that, in fact, the two brackets 20 comprise but one structure.

The shaft 18 above mentioned passes through a bearing 27 in the casing wall 12 and beyond such wall mounts a pulley 28 driven from any suitable source of power (not shown). At its other end within the casing 10 shaft 18 mounts a pulley 29 which, through a belt 30, drives a pulley 31 on the shaft 22. That end of shaft 22 opposite the end on which the pulley 31 is mounted is actually received in a sleeve-like member 32 and such sleeve-like member is, in turn, received in one of the bearings 21. The purpose of this arrangement will later appear.

Secured on the shaft 22 is a stepped pulley generally designated 33 and as shown has four steps each of V construction although it will be understood that the pulley may have a greater or lesser number of steps as may be necessary or desirable in any particular installation.

Mounted parallel with the shaft 22 is a shaft 34, one end of which has a bearing in a protuberance 35 on the casing wall 12 while the other end portion passes through a bearing 36 on the casing wall 11 and beyond such wall carries a pulley 37. The pulley 37 together with a collar 38 serves normally to hold the shaft 34 against endwise movement. On the shaft 34 is a stepped pulley generally designated 39 and shown as of the same construction as the pulley 33 but the pulleys 39 and 33 are arranged with their steps in opposite order.

Shaft 34 carries an elongated key 40 of a length much greater than the thickness of the pulley 39 and the pulley is provided with a keyway receiving the key 40. The pulley 39 is not otherwise secured to the shaft 34. With this construction it will be clear that said pulley is freely movable longitudinally of the shaft 34 whereby to bring any chosen step of the pulley 39 into alignment with any chosen step of the pulley 33.

Secured to or formed with one of the bracket parts 19 is a quadrant or arcuate rack 41 and such bracket part is also provided with a hand piece 42. A short shaft or stud 43 on the casing wall 12 pivotally mounts a pawl 44 adapted to be manually manipulated by a handle 45. A belt 46 is trained over the pulleys 33 and 39 and is shown as trained over the largest step of each such pulley.

It is noted particularly in Fig. 2 that the pawl 44 engaging a tooth of the quadrant 41, is maintaining the brackets 20 in positions to the rear of a position perpendicular to the shaft 34. Obviously, power applied to the pulley 28 is being transmitted through shaft 18 to pulley 29 and through belt 30 to pulley 31, through shaft 22 to pulley 33, through belt 46 to pulley 39 and thence through shaft 34 to pulley 37.

Pulley 28 being driven at a constant speed, pulley 37 may be driven at any of sixteen different speeds as determined by the pulley steps over which the belt 46 is trained. That is, any of the four steps of pulley 33 may, through the belt 46, be connected in driving relation with any step of the pulley 39. If these pulleys had each only three steps then nine different speeds could be transmitted whereby if each had five steps, twenty-five different speeds could be transmitted, etc.

Assuming the parts to be positioned as in the drawing, if a change in speed is desired the handle 45 is operated to release the pawl 44 from a tooth of the quadrant and the entire assembly of the brackets 21 and parts carried thereby will rock about the sleeve 17 into a perpendicular position. Since this results in movement of pulley 33 toward the pulley 39, the belt 46 is slackened and may be easily shifted so as to have it trained over the desired steps of the respective pulleys 33 and 39. Thereafter the handle 42 is operated to rock the bracket assembly and parts carried thereby in a clockwise direction about the sleeve 17 to tighten the belt 46 and the pawl 44 is again engaged with a tooth of the quadrant 41. A hollow extension 47 on the rear casing wall 13 partly receives the pulley 33 in its extreme adjusted position.

The sleeves 32 and 35 are provided so that the belt 46 may be replaced when necessary. By loosening the collar 36 the shaft 34 may be moved out of the bearing 35 and the belt passed over the end of such shaft and similarly the sleeve-like bearing 32 may be withdrawn from its bracket part 21 to expose the end of shaft 22 so that a belt may be passed over the end of said shaft. It will now be understood that the pulley 39 being free to move along the shaft 34 will so move to bring any particular step of that pulley over which the belt 46 is trained, into alignment with that step of the pulley 33 over which the belt is trained.

Pulley 33 is fixed to the shaft 22 and it will be apparent that when the parts have been moved to slacken the belt 46, it may readily be shifted onto any steps of the respective pulleys whereby to control the speed at which the shaft 34 is rotated. No guides or other means are provided to insure accurate alignment since as above stated, the pulley 39 is not fixed onto the shaft 34 and as such pulley is driven by the belt 46, it will be kept in position with its chosen step accurately aligned with the chosen step of pulley 33. Bracket parts 23 and 24 may be adjusted relatively to maintain the belt 30 under the proper tension.

Figure 3:
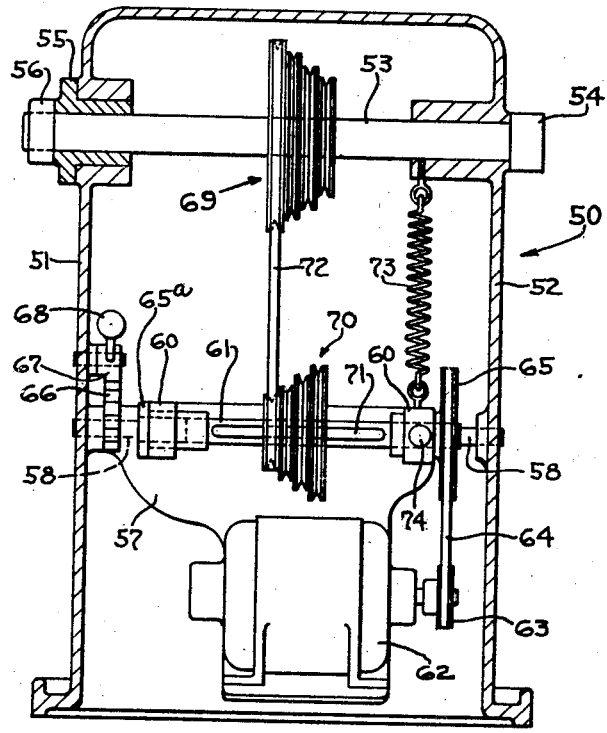
Fig. 3 is an elevational view of a slight modification, the transmission in this case being shown as applied to a machine tool drive.
Figure 4:
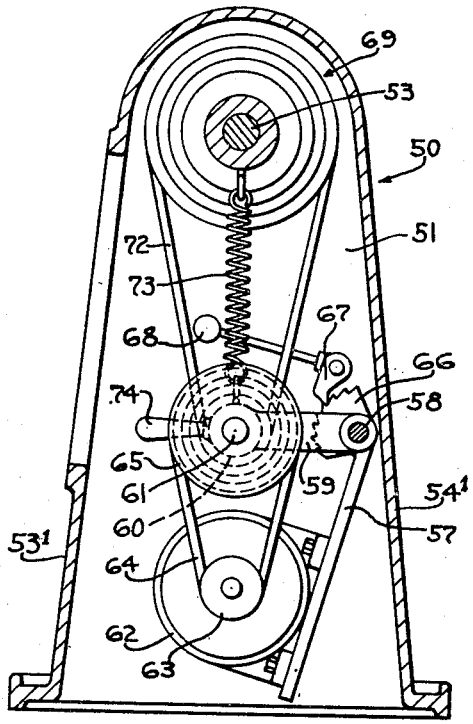
Fig. 4 is a view taken as looking from the right in Fig. 3 but with the wall of the casing omitted.

Referring now to Figs. 3 and 4, a casing generally designated 50 is shown and the same includes side walls 51 and 52 and front and rear walls 53' and 54'. Toward their upper ends, walls 51 and 52 rotatably mount a shaft 53 which may have a driving coupling 54 at one end at the outer side of the casing. The other end of said shaft may be held in a sleeve-like bearing 55 by a removable collar 56. On removal of this collar and bearing, a belt may be placed over the shaft 53 by drawing the belt about the shaft through the space normally occupied by said bearing.

In the lower part of the casing 50 is a platform-like member 57, pivotally mounted at 58 and including spaced arms 59 provided at their upper ends with bearing portions 60 rotatably mounting a shaft 61 disposed parallel to shaft 53. A motor 62, on the platform 57, through a pulley 63, drives a belt 64 also trained over a pulley 65 on the shaft 61. One end of the shaft 61 is mounted in a withdrawable sleeve 65ᵃ whereby such end of the shaft may be exposed to permit of the movement of a belt thereover. A quadrant 66 has its center in the axis of the pivotal mounting shaft 58 of platform 57. Pawl 67 is mounted for selected engagement with the teeth of the quadrant 66 and the pawl is operable by handle 68.

A step pulley generally designated 69 is fixed on the shaft 53 while a companion stepped pulley 70 has a key-way receiving the key 71 carried by the shaft 61. Such key 71 extends beyond both ends of the pulley 70 and with this construction, it will be obvious that the pulley 70 is freely shiftable along the shaft 61 so as to align any chosen step of the pulley 70 with any chosen step of the pulley 69. In this way the speed at which the shaft 53 is driven from the shaft 61 may be varied.

A belt 72 is shown as trained over these two pulleys and on manipulation of handle 68 to disengage the pawl 67 from a tooth of the quadrant 66, a coil spring 73 rocks the platform 57 and all parts mounted thereon about the pivot 58 whereby to slacken the belt 72 in order that it may be easily shifted to the desired steps of the pulleys. After the belt 72 has been properly disposed, a hand-piece 74 may be used to rock the platform and associated parts back against the action of the spring 73 to properly tension the belt and thereafter the handle 68 is used to engage the pawl 67 with the proper tooth of quadrant 66.

From this it will be understood that while the motor 62 operates at a constant speed, the pulley 70 may be so adjusted with respect to the pulley 69 that the driving coupling 54 is driven at any one of sixteen speeds when each of the pulleys 69 and 70 have four steps as shown although it will be clear that pulleys having a greater or lesser number of steps may be used as the work in hand may dictate. As the pulley 70 is freely movable along the shaft 61, it will be understood that it will correctly align itself with the pulley 69 as the belt 72 begins to drive.

Figures 5, 6:
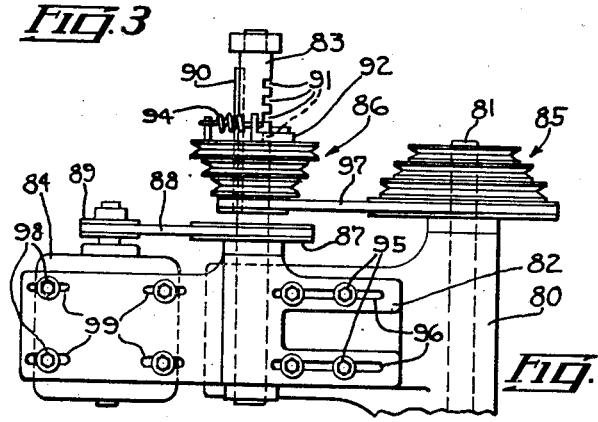
Fig. 5 is a detail view showing another slight modification, the invention in this case being illustrated as applied to a means including vertical shafts.
Fig. 6 is a detail view showing the latch means employed in Fig. 5.

Referring now to Figs. 5 and 6 at 80 is shown a base or support rotatably mounting a shaft 81 and adjustably mounting a base 82 which, in turn, rotatably mounts a shaft 83 and adjustably mounts a motor 84. In this construction the shafts 81 and 83 as well as the shaft of the motor 84 are all vertically disposed. Fixed to the shaft 81 is a stepped pulley 85 and movable along the shaft 83 (in a manner to be described) is a stepped pulley 86. A pulley 87 on the shaft 83 has trained thereover a belt 88 also trained over a pulley 89 on the shaft of motor 84.

A long key 90 carried by the shaft 83 passes through a key-way in the pulley 86 whereby the latter will rotate with the shaft but may be freely adjusted longitudinally thereof. The shaft 83 is provided with notches 91 and a latch 92 is pivoted on the pulley 86 at 93 and a coil spring 94 normally serves to retain the latch in a selected one of the notches 91. With this particular construction, when it is desired to shift the pulley 86 so as to bring any one of its steps into alignment with any chosen step of the pulley 85, the latch 92 is disengaged from one of the notches 91 and the pulley 86 is shifted along the shaft until the proper alignment is obtained and thereafter the latch 92 is engaged with the proper notch to retain the pulley in the desired location on the shaft.

With this construction any desired step of pulley 86 may be aligned and maintained in alignment with any desired step of the pulley 85. The use of the latch means is made necessary since the shafts are vertically disposed and this latch means may also be found desirable when a flat as distinguished from a V or other shaped belt is used in connection with flat pulleys as distinguished from the pulleys here disclosed.

Bolt and nut means 95 passing through slots 96 in the base 82 provide for adjustment of such base on the support 80 and thereby provide for adjustment of the shaft 83 toward and from the shaft 81 so that the belt 97, providing the driving connections between the pulleys 85 and 86, may be kept tight if different diameter steps of the pulleys are aligned. Somewhat similarly nut and bolt means 98 passing through the slots 99 in the base 82 and securing the motor 84 to said base, provide means whereby the motor may be adjusted toward and from the shaft 83 to keep the belt 88 properly tensioned.

Having thus set forth the nature of my invention, what I claim is:

1. In a transmission, a pair of parallel shafts, a stepped pulley on each of said shafts, a belt trained over said pulleys, means securing one of said pulleys for rotation with but for free movement along its shaft whereby said pulleys may be arranged with any selected step of one in alignment with any selected step of the other pulley, a supporting means mounting one of said shafts, means pivotally mounting said supporting means for swinging movement to carry its shaft toward and from the other shaft whereby the distance between the centers of said shafts may be adjusted to maintain the belt at a driving tension when trained over any selected steps of the pulleys; means whereby said means pivotally mounting said supporting means constantly tends to move the latter and its shaft toward the other shaft, and means to secure said bearing means in adjusted position.

2. In a transmission, a pair of parallel shafts, a stepped pulley on each of said shafts, a belt trained over said pulleys, means securing one of said pulleys for rotation with but for free movement along its shaft whereby said pulleys may be arranged with any selected step of one in alignment with any selected step of the other pulley, a supporting means mounting one of said shafts, means pivotally mounting said supporting means for swinging movement to carry its shaft toward and from the other shaft whereby the distance between the centers of said shafts may be adjusted to maintain the belt at a driving tension when trained over any selected steps of the pulleys, means whereby said means pivotally mounting said supporting means constantly tends to move the latter and its shaft toward the other shaft, and means including a toothed quadrant and a pivoted pawl to positively secure said bearing means in adjusted position.

3. In a transmission, a pair of parallel shafts, a stepped pulley on each of said shafts, a belt trained over said pulleys, means securing one of said pulleys for rotation with but for movement along its shaft whereby said pulleys may be arranged with any selected step of one in alignment with any selected step of the other pulley, a supporting means mounting one of said shafts, means mounting said supporting means for movement to carry its shaft toward and from the other shaft whereby the distance between the centers of said shafts may be adjusted to maintain the belt at a driving tension when trained over any selected steps of the pulleys, stepped means to positively secure said bearing means in various adjusted positions the number of which is determined by the number of steps in said means, and means whereby on release of the securing means said bearing means moves in a direction carrying its shaft toward the other shaft to slacken the belt.

4. In a transmission, a pair of parallel shafts, a stepped pulley on each of said shafts, a belt trained over said pulleys, means securing one of said pulleys for rotation with but for movement along its shaft whereby said pulleys may be arranged with any selected step of one in alignment with any selected step of the other pulley, a bracket mounting one of said shafts, means pivotally mounting said bracket for swinging movement to carry its shaft toward and from the other shaft whereby the distance between the centers of said shafts may be adjusted to maintain the belt at a driving tension when trained over any selected steps of the pulleys, a motor driving the shaft in said bracket, means mounting said motor on said bracket, said bracket mounted for gravitational movement to carry its shaft away from the other shaft, a spring normally tending to rock said bracket in a direction to carry its shaft toward the other shaft, and means to lock said bracket against movement by said spring.

5. In a transmission, three parallel shafts, means for driving one of said shafts, a bracket turnable about said shaft, a bearing means supported by said bracket and in which a second of said shafts is mounted, means driving said second shaft from the first shaft, a stepped pulley on said second shaft, a stepped pulley on the third of said shafts, a belt trained over said stepped pulleys, said stepped pulley on one of said shafts freely movable therealong whereby any of its steps may be aligned with any step of the other pulley, and means to secure said bracket in position maintaining said second and third shafts so spaced that there is a driving tension on said belt when the latter is trained over any chosen step of one of said stepped pulleys and any chosen step of the other of said stepped pulleys.

OSWALD A. OLSEN.